United States Patent
Li et al.

(10) Patent No.: US 12,173,235 B2
(45) Date of Patent: Dec. 24, 2024

(54) PROPOXYLATES FOR FOAM ENHANCEMENT

(71) Applicant: Halliburton Energy Services, Inc., Houston, TX (US)

(72) Inventors: Chunli Li, Houston, TX (US); Ronald Bosch, Houston, TX (US); Alejandra Inmaculada Lopez Trosell, Houston, TX (US); Jeffery Haney, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 18/132,342

(22) Filed: Apr. 7, 2023

(65) Prior Publication Data

US 2024/0336832 A1 Oct. 10, 2024

(51) Int. Cl.
| | |
|---|---|
| E21B 43/12 | (2006.01) |
| C09K 8/035 | (2006.01) |
| C09K 8/40 | (2006.01) |
| C09K 8/473 | (2006.01) |
| C09K 8/60 | (2006.01) |
| C09K 8/86 | (2006.01) |
| C09K 8/94 | (2006.01) |
| E21B 21/14 | (2006.01) |
| E21B 33/138 | (2006.01) |

(52) U.S. Cl.
CPC .............. C09K 8/94 (2013.01); C09K 8/035 (2013.01); C09K 8/40 (2013.01); C09K 8/473 (2013.01); C09K 8/602 (2013.01); C09K 8/86 (2013.01); E21B 21/14 (2013.01); E21B 33/138 (2013.01); E21B 43/122 (2013.01)

(58) Field of Classification Search
None
See application file for complete search history.

(56) References Cited

U.S. PATENT DOCUMENTS

| | | | | |
|---|---|---|---|---|
| 4,114,382 | A * | 9/1978 | Kubens | C09K 8/5755 405/259.1 |
| 5,004,623 | A | 4/1991 | Giddey et al. | |
| 5,007,489 | A * | 4/1991 | Enright | C09K 8/06 507/116 |
| 5,363,915 | A * | 11/1994 | Marquis | C09K 8/594 166/275 |
| 6,544,933 | B1 * | 4/2003 | Reid | C09K 8/22 507/261 |
| 2003/0092578 | A1 * | 5/2003 | Hirasaki | C09K 8/518 507/100 |
| 2005/0082090 | A1 * | 4/2005 | Grainger | C09K 8/38 175/66 |
| 2007/0079963 | A1 * | 4/2007 | Yang | C09K 8/536 166/309 |
| 2007/0093602 | A1 * | 4/2007 | Thompson-Colon | E04G 23/024 525/127 |
| 2012/0067586 | A1 * | 3/2012 | Koczo | C09K 8/703 507/221 |

(Continued)

Primary Examiner — Andrew Sue-Ako
(74) Attorney, Agent, or Firm — Barnes & Thornburg, LLP

(57) ABSTRACT

Foamed treatment fluids and methods for treating a wellbore with a foamed treatment fluid. An example method prepares a foamed treatment fluid by combining an aqueous base fluid, a foaming agent, and a propoxylates. The foamed treatment fluid is introduced into a wellbore and a wellbore operation is performed with the foamed treatment fluid.

20 Claims, 8 Drawing Sheets

(56) References Cited

U.S. PATENT DOCUMENTS

2013/0029883 A1* 1/2013 Dismuke ............... C09K 8/602
　　　　　　　　　　　　　　　　　　507/260

* cited by examiner

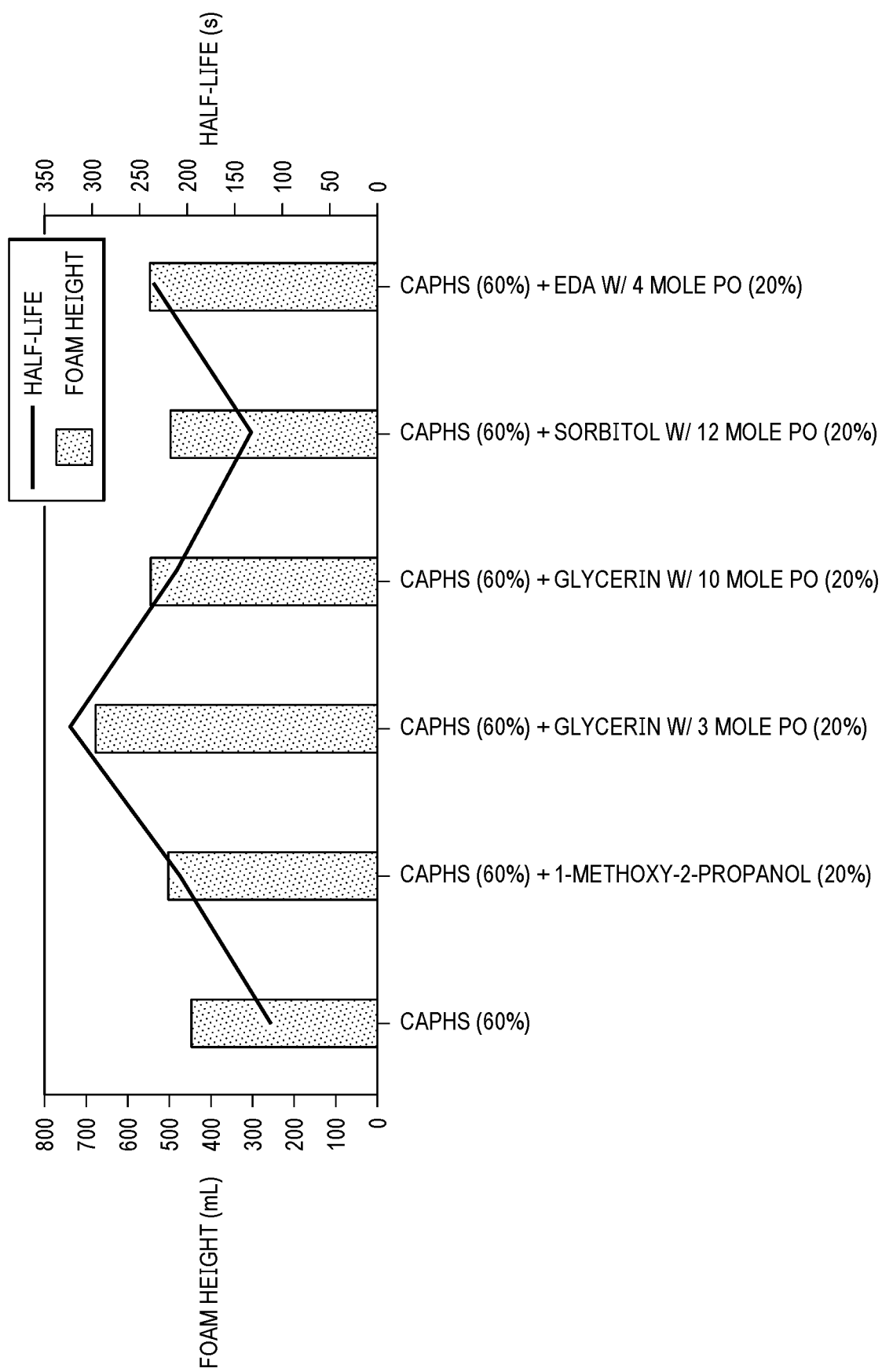

PROPOXYLATES FOR FOAM ENHANCEMENT

TECHNICAL FIELD

The present disclosure relates generally to wellbore operations, and more particularly, to the use of low molecular weight propoxylates for enhancing the foaming of treatment fluids used in wellbore operations.

BACKGROUND

During a wellbore operation, a treatment fluid may be introduced into the wellbore to treat the subterranean formation. These treatment fluids may be used during all phases of wellbore construction and production. Some treatment fluids are foamed in order to lower their density and increase their viscosity. Foamed treatment fluids are used in a variety of wellbore operations including drilling, completion, production, and stimulation operations. Some examples of foamed treatment fluids include, but are not limited to, drilling fluids, well cleanup fluids, workover fluids, conformance fluids, cementing fluids, gravel pack fluids, acidizing fluids, fracturing fluids, spacer fluids, a gas lifting chemical, and the like.

Foaming surfactants may be used to generate foam in the treatment fluids. Foaming surfactants may contain primary foaming agents to generate foam, as well as foam enhancers to potentiate foam formation and foam stability. The use of foamed treatment fluids is an important part of many wellbore operations. The present invention provides improved compositions and methods for foaming treatment fluids for wellbore use.

BRIEF DESCRIPTION OF THE DRAWINGS

Illustrative examples of the present disclosure are described in detail below with reference to the attached drawing figures, which are incorporated by reference herein, and wherein:

FIG. 8 is a graph of a comparison of various propoxylates on a foaming agent of 60% cocamidopropyl hydroxysultaine in accordance with one or more examples described herein.

Figure 1:
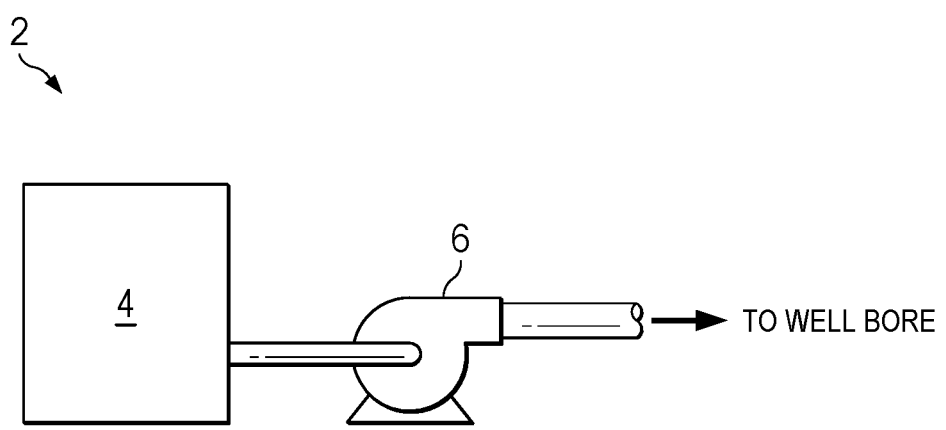
FIG. 1 illustrates a schematic of the preparation of a foamed treatment fluid in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to the use of low molecular weight propoxylates for enhancing the foaming of treatment fluids used in wellbore operations.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The present disclosure relates generally to wellbore operations, and more particularly, to the use of low molecular weight propoxylates for enhancing the foaming of treatment fluids used in wellbore operations. Foamed treatment fluids are used in a variety of wellbore operations performed in subterranean formations. As used herein, the term "foamed treatment fluid" will be understood to include any foamed fluid that may be used in a wellbore operation. The term "treatment fluid" does not imply any particular action by the fluid. Advantageously, the foamed treatment fluids are prepared with low molecular weight propoxylates that provide sufficient foaming enhancement and stabilization. As a further advantage of the present invention, foamed treatment fluids comprising propoxylates may be less expensive to produce than similar foamed treatment fluids comprising traditional foam enhancers instead. An additional advantage is that the propoxylates may be used as foam enhancers in a variety of foamed treatment fluids. Another advantage of the present invention is that the propoxylates are compatible with a variety of foaming agents. Moreover, some of the propoxylates described herein may have higher flash points and be less toxic than traditional foam enhancers, thereby decreasing risks to wellbore personnel.

The propoxylates described herein are the low molecular weight reaction products of propylene oxide with an alcohol, acid, or amine to produce an alcohol propoxylate, an acid propoxylate, or an amine propoxylate respectively. The molecular weight of the propoxylates is determined by the molar ratio of the propylene oxide to the alcohol, acid, amine, or vegetable oil reactant. More particularly, some propoxylate examples include, but are not limited to, propylene oxide condensates of alkyl phenol, fatty acids, fatty alcohol, amines, synthetic alcohols, and the like. Generally, the propoxylates may be described as oligomers or polymers. Propoxylates having lower molecular weights may perform better than those with higher molecular weights. In some examples, higher molecular weight propoxylates may act as defoaming agents and may undesirably destabilize the foamed treatment fluids. As such, the molecular weight is an important factor in selecting a propoxylate for the foaming application.

Any suitable alcohol may be reacted with propylene oxide to produce an alcohol propoxylate. Examples of suitable alcohols, may include but are not limited to, methanol, ethanol, propanol, butanol, pentanol, ethylene glycol, propanediol, pentaerythritol, glycerol, sorbitol, or any combination of alcohols. Specific examples of suitable alcohol propoxylate condensates include, but are not limited to, propoxylated methanol, propoxylated ethanol, propoxylated propanol, propoxylated butanol, propoxylated pentanol, propoxylated ethylene glycol, propoxylated propanediol, propoxylated pentaerythritol, propoxylated glycerol, propoxylated sorbitol, or any combination of propoxylates.

Any suitable acid may be reacted with propylene oxide to produce an acid propoxylate. Examples of suitable acids, may include but are not limited to, formic acid, acetic acid, citric acid, oxalic acid, succinic acid, maleic acid, and adipic acid, or any combination of acids. Specific examples of suitable acid propoxylate condensates include, but are not limited to, propoxylated formic acid, propoxylated acetic acid, propoxylated citric acid, propoxylated oxalic acid, propoxylated succinic acid, propoxylated maleic acid, propoxylated adipic acid, or any combination of propoxylates.

Any suitable amine may be reacted with propylene oxide to produce an amine propoxylate. Examples of suitable amines, may include but are not limited to, methylamine, dimethylamine, trimethylamine, ethylamine, ethylenediamine, diethylene triamine, triethylene tetramine, tetraethylenepentamine, or any combination of amines. Specific examples of suitable amine propoxylate condensates include, but are not limited to, propoxylated methylamine, propoxylated dimethylamine, propoxylated trimethylamine, propoxylated ethylamine, propoxylated ethylenediamine, propoxylated diethylene triamine, propoxylated triethylene tetramine, propoxylated tetraethylenepentamine, or any combination of propoxylate. In some examples, the propoxylates may be used as a substitute for non-propoxylate foam enhancers.

Generally, the selected propoxylate will have a molecular weight sufficient for enhancing the foaming properties of the treatment fluid. The selection of the propoxylate will depend on the species and concentration of the foaming agent, the treatment fluid application, and the presence of additives. The molecular weight of the propoxylate for any treatment fluid may range from about 90 to about 1000 g/mol. The molecular weight may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the molecular weight of the propoxylate in the treatment fluid may range from about 90 to about 1000 g/mol, from about 90 to about 950 g/mol, from about 90 to about 900 g/mol, from about 90 to about 850 g/mol, from about 90 to about 800 g/mol, from about 90 to about 750 g/mol, from about 90 to about 700 g/mol, from about 90 to about 650 g/mol, from about 90 to about 600 g/mol, from about 90 to about 550 g/mol, from about 90 to about 500 g/mol, from about 90 to about 450 g/mol, from about 90 to about 400 g/mol, from about 90 to about 350 g/mol, from about 90 to about 300 g/mol, from about 90 to about 250 g/mol, from about 90 to about 200 g/mol, from about 90 to about 150 g/mol, or from about 90 to about 1000 g/mol. As another example, the molecular weight of the propoxylate in the treatment fluid may range from about 90 to about 1000 g/mol, from about 100 to about 1000 g/mol, from about 150 to about 1000 g/mol, from about 200 to about 1000 g/mol, from about 250 to about 1000 g/mol, from about 300 to about 1000 g/mol, from about 350 to about 1000 g/mol, from about 400 to about 1000 g/mol, from about 450 to about 1000 g/mol, from about 500 to about 1000 g/mol, from about 550 to about 1000 g/mol, from about 600 to about 1000 g/mol, from about 650 to about 1000 g/mol, from about 700 to about 1000 g/mol, from about 750 to about 1000 g/mol, from about 800 to about 1000 g/mol, from about 850 to about 1000 g/mol, from about 900 to about 1000 g/mol, or from about 950 to about 1000 g/mol. With the benefit of this disclosure, one of ordinary skill in the art will be readily able to prepare and select a propoxylate having a desirable molecular weight for a given application.

The concentration of the propoxylate in a treatment fluid may range from about 1% w/w to about 50% w/w. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the propoxylate in a treatment fluid may range from about 1% (w/w) to about 50% (w/w), from about 5% (w/w) to about 50% (w/w), from about 10% (w/w) to about 50% (w/w), from about 15% (w/w) to about 50% (w/w), from about 20% (w/w) to about 50% (w/w), from about 25% (w/w) to about 50% (w/w), from about 30% (w/w) to about 50% (w/w), from about 35% (w/w) to about 50% (w/w), from about 40% (w/w) to about 50% (w/w), or from about 45% (w/w) to about 50% (w/w). As another example, the concentration of the foaming agent in the treatment fluid may range from about 1% (w/w) to about 50% (w/w), from about 1% (w/w) to about 45% (w/w), from about 1% (w/w) to about 40% (w/w), from about 1% (w/w) to about 35% (w/w), from about 1% (w/w) to about 30% (w/w), from about 1% (w/w) to about 25% (w/w), from about 1% (w/w) to about 20% (w/w), from about 1% (w/w) to about 15% (w/w), from about 1% (w/w) to about 10% (w/w), or from about 1% (w/w) to about 5% (w/w). With the benefit of this disclosure, one of ordinary skill in the art will be readily able to prepare and select a propoxylate having a desirable concentration for a given application.

The propoxylates may be used to foam a variety of treatment fluids including, but not limited to, drilling fluids, well cleanup fluids, workover fluids, conformance fluids, cementing fluids, gravel pack fluids, acidizing fluids, fracturing fluids, spacer fluids, a gas lifting chemical, and the like.

The propoxylates may be used to enhance the foam produced by a variety of foaming agents. The foaming agents are included in the treatment fluids to facilitate foaming and in some examples, to also stabilize the resultant foam formed therewith. Generally, the treatment fluids may be foamed with the addition of the foaming agent. In some optional examples, a gas may also be injected and mixed in the treatment fluid to enhance foam formation. In some examples, the treatment fluid may be agitated after the addition of the foaming agent and/or the gas. By way of example, the foaming agent may comprise an anionic, nonionic, amphoteric (including zwitterionic), or cationic surfactant. In some examples, mixtures of different foaming agent species may be used. Examples of suitable foaming agents include, but are not limited to: hydroxysultaines such as cocamidopropyl hydroxysultaine, lauryl hydroxysultaine, lauramidopropyl hydroxysultaine; betaines such as lauryl betaine; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines; alkyl or alkene amidipropylbetaines such as cocoamidopropyl betaine; alpha-olefin sulfonates; quaternary surfactants such as trimethyltallowammonium chloride and trimethylcocoammonium chloride; C8 to C22 alkylethoxylate sulfates; alkyl ether sulfates, mixtures of an ammonium salt of an alkyl ether sulfate and sodium chloride; or any combination of foaming agents.

The concentration of the foaming agent in the treatment fluid may range from about 100 ppm to about 50,000 ppm. The concentration of the foaming agent in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the foaming agent in the treatment fluid may range from about 100 ppm to about 50,000 ppm, from about 100 ppm to about 45,000 ppm, from about 100 ppm to about 40,000 ppm, from about 100 ppm to about 35,000 ppm, from about 100 ppm to about 30,000 ppm, from about 100 ppm to about 25,000 ppm, from about 100 ppm to about 20,000 ppm, from about 100 ppm to about 15,000 ppm, from about 100 ppm to about 10,000 ppm, from about 100 ppm to about 5,000 ppm, or from about 100 ppm to about 1,000 ppm. As another example, the concentration of the foaming agent in the treatment fluid may range from about 100 ppm to about 50,000 ppm, from about 1,000 ppm to about 50,000 ppm, from about 5,000 ppm to about 50,000 ppm, from about 10,000 ppm to about 50,000 ppm, from about 15,000 ppm to about 50,000 ppm, from about 20,000 ppm to about 50,000 ppm, from about 25,000 ppm to about 50,000 ppm, from about 30,000 ppm to about 50,000 ppm, from about 35,000 ppm to about 50,000 ppm, from about 40,000 ppm to about 50,000 ppm, or from about 45,000 ppm to about 50,000 ppm. With the benefit of this disclosure, one of ordinary skill in the art will be able to prepare a treatment fluid having a sufficient concentration of a foaming agent for a given application.

Some examples of the treatment fluids described herein comprise an aqueous base fluid, for example, freshwater, saltwater (e.g., water containing one or more salts dissolved therein), brine (e.g., saturated saltwater, including saturated saltwater produced from subterranean formations), seawater, or any combination thereof. Generally, the aqueous base fluid may be from any source provided that the aqueous base fluid does not contain an excess of compounds that may undesirably affect other components in the treatment fluid. In the case of brines, the aqueous base fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. One of ordinary skill in the art, with the benefit of this disclosure, should be readily able to select an aqueous base fluid for a chosen application.

The concentration of the aqueous base fluid in the treatment fluid may range from about 1% (w/v) to about 99% (w/v). The concentration of the aqueous base fluid in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous base fluid in the treatment fluid may range from about 1% (w/v) to about 99% (w/v), from about 5% (w/v) to about 99% (w/v), from about 10% (w/v) to about 99% (w/v), from about 15% (w/v) to about 99% (w/v), from about 20% (w/v) to about 99% (w/v), from about 25% (w/v) to about 99% (w/v), from about 30% (w/v) to about 99% (w/v), from about 35% (w/v) to about 99% (w/v), from about 40% (w/v) to about 99% (w/v), from about 45% (w/v) to about 99% (w/v), from about 55% (w/v) to about 99% (w/v), from about 60% (w/v) to about 99% (w/v), from about 65% (w/v) to about 99% (w/v), from about 70% (w/v) to about 99% (w/v), from about 75% (w/v) to about 99% (w/v), from about 80% (w/v) to about 99% (w/v), from about 85% (w/v) to about 99% (w/v), from about 90% (w/v) to about 99% (w/v), or from about 95% (w/v) to about 99% (w/v). As another example, the concentration of the aqueous base fluid in the treatment fluid may range from about 1% (w/v) to about 99% (w/v), from about 1% (w/v) to about 95% (w/v), from about 1% (w/v) to about 90% (w/v), from about 1% (w/v) to about 85% (w/v), from about 1% (w/v) to about 80% (w/v), from about 1% (w/v) to about 75% (w/v), from about 1% (w/v) to about 70% (w/v), from about 1% (w/v) to about 65% (w/v), from about 1% (w/v) to about 60% (w/v), from about 1% (w/v) to about 55% (w/v), from about 1% (w/v) to about 50% (w/v), from about 1% (w/v) to about 45% (w/v), from about 1% (w/v) to about 40% (w/v), from about 1% (w/v) to about 35% (w/v), from about 1% (w/v) to about 30% (w/v), from about 1% (w/v) to about 25% (w/v), from about 1% (w/v) to about 20% (w/v), from about 1% (w/v) to about 15% (w/v), from about 1% (w/v) to about 10% (w/v), or from about 1% (w/v) to about 5% (w/v). With the benefit of this disclosure, one of ordinary skill in the art will be able to prepare a treatment fluid having a sufficient concentration of an aqueous base fluid for a given application.

Some examples of the treatment fluids are foamed drilling fluids used to drill a wellbore in a subterranean formation. These foamed drilling fluids comprise the propoxylates described herein to enhance the foam quality of the foamed drilling fluids. Generally, the foamed drilling fluids comprise a base fluid, a foaming agent, and a propoxylate. Optionally, various treatment fluid additives may be included in the drilling fluid compositions to adjust a fluid property (e.g., the density) as desired. In some examples, the drilling fluid may use an oil as a base fluid instead of an aqueous base fluid. Any type of drilling fluid may be used with the foaming applications disclosed herein. Examples of drilling fluids may include, but are not limited to, aqueous-based drilling fluids, oil-based drilling fluids, and synthetic-based drilling fluids.

One or more dissolved salts may also be included in the foamed drilling fluids. Where used, the dissolved salt may be included in the drilling fluid for many purposes, including, but not limited to, densifying a drilling fluid to a chosen density. A mixture of one or more dissolved salts may be used in some instances. Drilling fluids containing dissolved salts, may also be referred to as a brine. As used herein, the term "brine" refers to a water-based fluid that includes a dissolved salt (or mixture of dissolved salts) in an amount of about 5 wt. % or greater by weight of the water. Suitable dissolved salts may include monovalent and divalent salts, which may be used, for example, to form monovalent or divalent brines. Mixtures of monovalent and divalent salts may also be used. Suitable monovalent salts may include, but are not limited to, sodium chloride, sodium bromide, potassium bromide, potassium chloride, lithium chloride, sodium formate potassium formate, cesium formate, and mixtures thereof among others. Suitable divalent salts may include, but are not limited to, calcium bromide, zinc bromide, calcium chloride, manganese bromide, manganese chloride, zinc chloride and mixtures thereof.

Some examples of the foamed drilling fluids may also include weighting agents to increase the density of the drilling fluids. By way of example, weighting agents may have a specific gravity of about 2 or higher (e.g., about 2, about 4, etc.). Suitable weighting agents may include, but are not limited to, calcium carbonate, magnesium carbonate, iron carbonate, hematite, illmenite, hausmannite, barite, manganese tetraoxide, or combinations thereof.

Some examples of the treatment fluids are foamed cementing fluids that comprise a hydraulic cement. These foamed cementing fluids comprise the propoxylates described herein to enhance the foam quality of the foamed cementing fluids. Generally, the foamed cementing fluids comprise an aqueous base fluid, a hydraulic cement, a foaming agent, and a propoxylate. Optionally, various treatment fluid additives may be included in the cementing fluid compositions to adjust a cement property (e.g., the density) as desired. These cementing fluids may be used in a variety of subterranean applications, including primary and remedial cementing. The cementing fluids may be introduced into a subterranean formation and allowed to set. As used herein, introducing the cementing fluid into a subterranean formation includes introduction into any portion of the subterranean formation, into a near wellbore region surrounding the wellbore, or into both. In primary cementing applications, the cementing fluid may be introduced into the annular space between a conduit located in a wellbore and the walls of the wellbore (and/or a larger conduit in the wellbore). The cementing fluid may be allowed to set in the annular space to form an annular sheath of hardened cement. The hardened cement may form a barrier that prevents the migration of fluids in the annulus of the wellbore. The hardened cement may also, for example, support the conduit in the wellbore. In remedial cementing applications, the cementing fluids may be used in squeeze cementing operations or in the placement of cement plugs. By way of example, the cementing fluids may be placed in a wellbore to plug an opening (e.g., a void or crack) in the formation, in a gravel pack, in a conduit, in a cement sheath, and/or between the cement sheath and the conduit (e.g., a microannulus).

A variety of hydraulic cements may be utilized in accordance with the present disclosure, including, but not limited to, cements comprising calcium, aluminum, silicon, oxygen, iron, and/or sulfur, which set and harden by reaction with water. Suitable hydraulic cements may include Portland cements, gypsum, and high alumina content cements, among others. Portland cements that are suited for use in the present disclosure may be classified as Classes A, C, G, and H cements according to American Petroleum Institute, API Specification for Materials and Testing for Well Cements, API Specification 10, Fifth Ed., Jul. 1, 1990. In addition, in some examples, cements suitable for use in the present invention may be classified as ASTM Type I, II, or III.

The hydraulic cement generally may be included in the cementing fluids in an amount sufficient to provide the desired compressive strength, density, and/or cost. The hydraulic cement may be present in the cementing fluids in an amount in the range of about 0% to about 99% by weight of cement ("bwoc"). In some examples, the hydraulic cement may be present in an amount ranging between any of and/or including any of about 1%, about 5%, about 10%, about 20%, about 40%, about 60%, about 80%, or about 90% bwoc. Some of the cementing fluids may also be free (or essentially free) of Portland cement. Those of ordinary skill in the art, with the benefit of this disclosure, should be able to select an appropriate amount of hydraulic cement for a particular application.

Some examples of the treatment fluids are spacer fluids used to flush a previously introduced treatment fluid from the wellbore and/or to separate two treatment fluids from contact with one another. For example, the spacer fluid may be used to displace a first fluid (e.g., a drilling fluid) and prevent a second fluid (e.g., a cement composition) from contacting the first fluid. The spacer fluid may also displace the first fluid and/or filter cake solids from the wellbore in advance of the second fluid. Removal of these fluids from the wellbore may enhance bonding of the second fluid (e.g., a cement composition) to surfaces in the wellbore. These foamed spacer fluids comprise the propoxylates described herein to enhance the foam quality of the foamed spacer fluids. Generally, the foamed spacer fluids comprise an aqueous base fluid, a foaming agent, and a propoxylate.

Optionally, treatment fluid additives may be included in the spacer fluid compositions to adjust the density as desired.

Some examples of the treatment fluids are foamed acidizing fluids injected into the well at a pressure below the fracture gradient of the formation to either stimulate the well or remove formation damaged areas. For example, the acidizing fluid can dissolve sediments and mud solids within the pores of the formation matrix that inhibit the permeability of the rock. This process enlarges the natural pores of the reservoir which stimulates the flow of hydrocarbons. These foamed acidizing fluids comprise the propoxylates described herein to enhance the foam quality of the foamed acidizing fluids. Generally, the foamed acidizing fluids comprise an aqueous base fluid, an acid, a foaming agent, and a propoxylate. Optionally, treatment fluid additives may be included in the acidizing fluid compositions to adjust a fluid property as desired. Some examples of common acidizing fluid additives include corrosion inhibitors.

Some examples of the treatment fluids are foamed fracturing fluids which may be injected into the well when a lower hydrostatic pressure in the wellbore is needed than would occur with more traditional non-foamed treatment fluids. Generally, the foamed fracturing fluids comprise an aqueous base fluid, a foaming agent, a propoxylate, and a viscosifying agent. Optionally, treatment fluid additives may be included in the fracturing fluid compositions to adjust a fluid property as desired.

In some optional examples, the foamed treatment fluids may further comprise an additive. The additive may be used to adjust a property of the treatment fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, iron control agents, particulate diverters, salts, fluid loss control additives, gas, catalysts, clay control agents, dispersants, flocculants, scavengers (e.g., H2S scavengers, CO2 scavengers or O2 scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a treatment fluid having properties suitable for a desired application.

In some examples, the treatment fluids may be foamed with a foam quality in a range of about 70% to about 99%. Alternatively, in a range of about 70% to about 80%, in a range of about 80% to about 90%, or in a range of about 90% to about 99%. As used herein, the term "foam quality" refers to the volume of entrained gas and is defined by the following formula: Foam Quality=(Total Foam Volume−Liquid Volume)/Total Foam Volume. The propoxylates described herein may be used to enhance the foam quality of the treatment fluids.

The foamed treatment fluids have a density suitable for a particular application. By way of example, the foamed treatment fluids may have a density in a range of from about 4 pounds per gallon ("lb/gal") to about 20 lb/gal, in a range of from about 8 lb/gal to about 12 lb/gal, or in a range of from about 12 lb/gal to about 20 lb/gal. Some examples of the foamed treatment fluids may include additives to reduce their densities, such as hollow microspheres, low-density elastic beads, or other density-reducing additives known in the art. With the benefit of this disclosure, those of ordinary skill in the art will readily recognize the appropriate density of a foamed treatment fluid for a particular application.

FIG. 1 illustrates a schematic of the preparation of a foamed treatment fluid in accordance with the examples disclosed herein. A system 2 is used for the preparation of a foamed treatment fluid and delivery to a wellbore. As shown, the treatment fluid may be prepared by mixing an aqueous base fluid, a foaming agent, and a propoxylate in mixing equipment 4, which may be a jet mixer, re-circulating mixer, or a batch mixer. The foamed treatment fluid may then be pumped via pumping equipment 6 to the wellbore. In some examples, the mixing equipment 4 and the pumping equipment 6 may be disposed on one or more mixing trucks as will be apparent to those of ordinary skill in the art. In some examples, a jet mixer may be used, for example, to continuously mix the foaming agent and propoxylate with the aqueous base fluid as it is being pumped into the wellbore.

It should be clearly understood that the example system illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
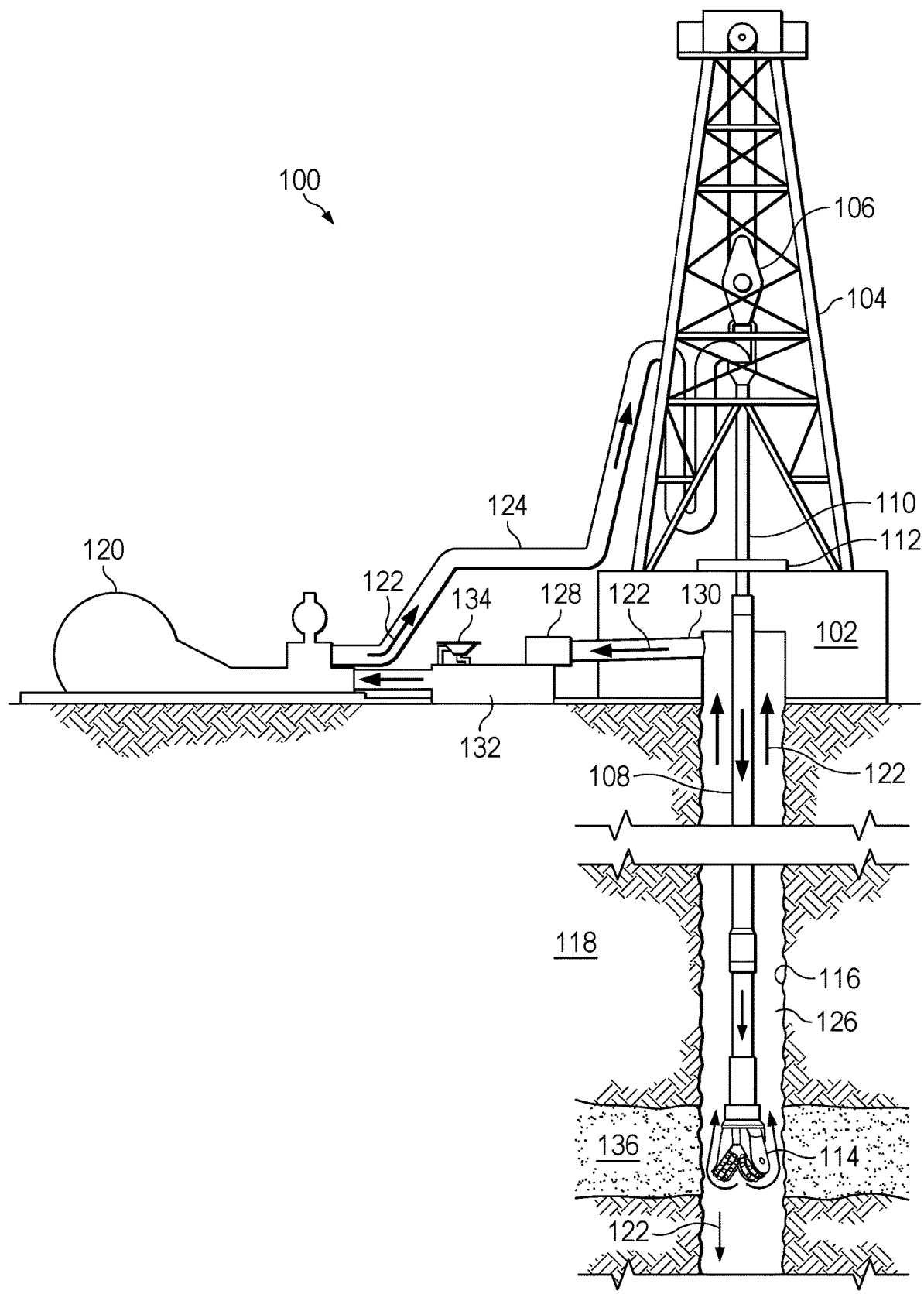
FIG. 2 illustrates a schematic of a drilling assembly in which a foamed drilling fluid is used in accordance with one or more examples described herein.

FIG. 2 illustrates a schematic of a drilling assembly 100 in which a foamed drilling fluid 122 as disclosed above may be used. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118. In an embodiment, the drill bit 114 may penetrate reservoir section 136.

Foamed drilling fluid 122 comprises an aqueous base fluid, a foaming agent, and a propoxylate to enhance and stabilize the foam. A pump 120 (e.g., a mud pump) may circulate foamed drilling fluid 122 through a feed pipe 124 and to the kelly 110, which conveys the foamed drilling fluid 122 downhole through the interior of the drill string 108 and through one or more orifices in the drill bit 114 and into reservoir section 136. The foamed drilling fluid 122 may then be circulated back to the surface via an annulus 126 defined between the drill string 108 and the walls of the wellbore 116. At the surface, the recirculated or spent foamed drilling fluid 122 may exit the annulus 126 and may be conveyed to one or more fluid processing unit(s) 128 via an interconnecting flow line 130. The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the foamed drilling fluid 122.

After passing through the fluid processing unit(s) 128, a "cleaned" foamed drilling fluid 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more drilling fluid additives may be added to the foamed drilling fluid 122 via a mixing hopper 134 communicably coupled to or otherwise in fluid communication with the retention pit 132. In some examples, the drilling fluid additives comprise additional foaming agent and/or propoxylate that may be added to the foamed drilling fluid 122 via the mixing hopper. The mixing hopper 134 may include, but is not limited to, mixers and related mixing equipment known to those skilled in the art. Alternatively, the drilling fluid additives may be added to the foamed drilling fluid 122 at any other location in the drilling assembly 100. While FIG. 2 shows only a single retention pit 132, there could be more than one retention pit 132, such as multiple retention pits 132 in series. Moreover, the retention pit 132 may be representative of one or more fluid storage facilities and/or units where the drilling fluid additives may be stored, reconditioned, and/or regulated until added to the foamed drilling fluid 122.

It should be clearly understood that the example system illustrated by FIG. 2 is merely a general application of the principles of this disclosure in practice, and a wide variety of other examples are possible. Therefore, the scope of this disclosure is not limited in any manner to the details of FIG. 2 as described herein.

Figure 3:
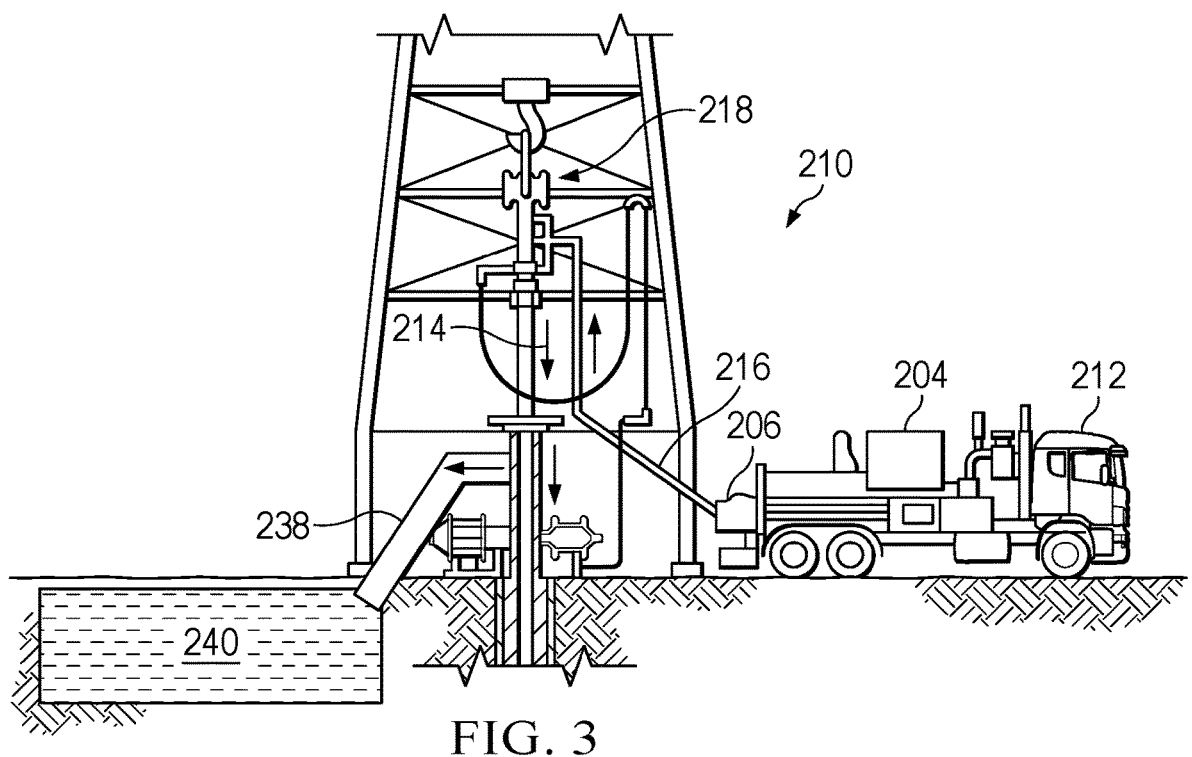
FIG. 3 is a schematic illustrating an example technique for placing a foamed cementing fluid into a subterranean formation in accordance with one or more examples described herein.
Figure 4:
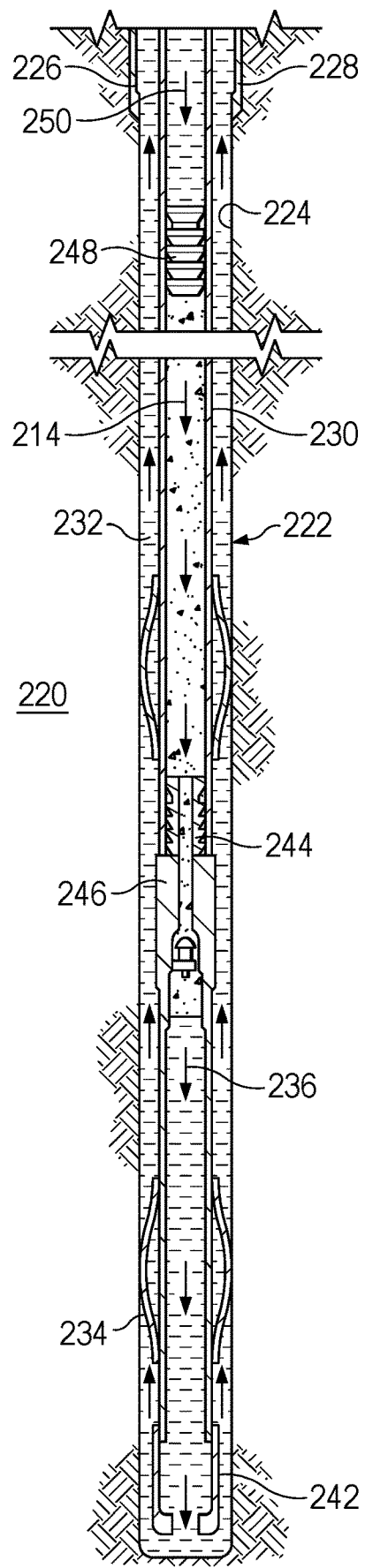
FIG. 4 is a schematic continuing the illustrated example technique of FIG. 3 in accordance with one or more examples described herein.

FIGS. 3 and 4 are schematics illustrating an example technique for placing a foamed cementing fluid 214 into a subterranean formation. FIG. 3 illustrates surface equipment 210 that may be used in the placement of a foamed cementing fluid 214 in accordance with certain examples. It should be noted that while FIG. 3 generally depicts a land-based operation, those skilled in the art will readily recognize that the principles described herein are equally applicable to subsea operations that employ floating or sea-based platforms and rigs, without departing from the scope of the disclosure. As illustrated by FIG. 3, the surface equipment 210 may include a cementing unit 212, which may include one or more cement trucks. The cementing unit 212 may include mixing equipment 204 and pumping equipment 206 as will be apparent to those of ordinary skill in the art. Mixing equipment 204 may be used to mix an aqueous base fluid, a cement, a foaming agent, and a propoxylate to produce the foamed cement composition 214. The cementing unit 212 may pump a foamed cementing fluid 214 through a feed pipe 216 and to a cementing head 218 which conveys the foamed cementing fluid 214 downhole.

Turning now to FIG. 4, the foamed cementing fluid 214 may be placed into a subterranean formation 220 in accordance with some of the examples described herein. As illustrated, a wellbore 222 may be drilled into the subterranean formation 220. While wellbore 222 is shown extending generally vertically into the subterranean formation 220, the principles described herein are also applicable to wellbores that extend at an angle through the subterranean formation 220, such as horizontal and slanted wellbores. As illustrated, the wellbore 222 comprises walls 224. In the illustrated embodiment, a surface casing 226 has been inserted into the wellbore 222. The surface casing 226 may be cemented to the walls 224 of the wellbore 222 by cement sheath 228. In the illustrated embodiment, one or more additional conduits (e.g., intermediate casing, production casing, liners, etc.), shown here as casing 230 may also be disposed in the wellbore 222. As illustrated, there is a wellbore annulus 232 formed between the casing 230 and the walls 224 of the wellbore 222 and/or the surface casing 226. One or more centralizers 234 may be attached to the casing 230, for example, to centralize the casing 230 in the wellbore 222 prior to and during the cementing operation.

With continued reference to FIG. 4, the foamed cementing fluid 214 may be pumped down the interior of the casing 230. The foamed cementing fluid 214 may be allowed to flow down the interior of the casing 230 through the casing shoe 242 at the bottom of the casing 230 and up around the casing 230 into the wellbore annulus 232. The foamed cementing fluid 214 may be allowed to set in the wellbore annulus 232, for example, to form a cement sheath that supports and positions the casing 230 in the wellbore 222. While not illustrated, other techniques may also be utilized for introduction of the foamed cementing fluid 214. By way of example, reverse circulation techniques may be used that include introducing the foamed cementing fluid 214 into the subterranean formation 220 by way of the wellbore annulus 232 instead of through the casing 230.

As it is introduced, the foamed cementing fluid 214 may displace a foamed spacer fluid 236 introduced previously to separate the foamed cementing fluid 214 from a drilling fluid. Foamed spacer fluid 236 comprises a propoxylate to enhance and stabilize the resulting foam. Although both the cementing fluid 214 and spacer fluid 236 are described as being foamed, it is to be understood that both treatment fluids do not need to be foamed in some examples. For example, some wellbore operations may require that only the cementing fluid 214 be foamed or that only the spacer fluid 236 be foamed.

With continued reference to FIG. 4, at least a portion of the foamed spacer fluid 236 exits the wellbore annulus 232 via a flow line 238 and is deposited, for example, in one or more retention pits 240 (e.g., a mud pit), as shown on FIG. 3. Referring again to FIG. 4, a bottom plug 244 may be introduced into the wellbore 222 ahead of the foamed cementing fluid 214, for example, to separate the foamed cementing fluid 214 from the foamed spacer fluid 236 that may be inside the casing 230 prior to cementing. After the bottom plug 244 reaches the landing collar 246, a diaphragm or other suitable device should rupture to allow the foamed cementing fluid 214 through the bottom plug 244. In FIG. 4, the bottom plug 244 is shown on the landing collar 246. In the illustrated example, a top plug 248 may be introduced into the wellbore 222 behind the foamed cementing fluid 214. The top plug 248 may separate the foamed cementing fluid 214 from a spacer fluid 250 (which may or may not be foamed) and may also push the foamed cementing fluid 214 through the bottom plug 244.

It should be clearly understood that the example system illustrated by FIGS. 3 and 4 is merely a general application of the principles of this disclosure in practice, and a wide variety of other examples are possible. Therefore, the scope of this disclosure is not limited in any manner to the details of FIGS. 3 and 4 as described herein.

To facilitate a better understanding of the present embodiments, the following examples of certain aspects of some embodiments are given. In no way should the following examples be read to limit, or define, the entire scope of the embodiments.

EXAMPLES

Figure 5:
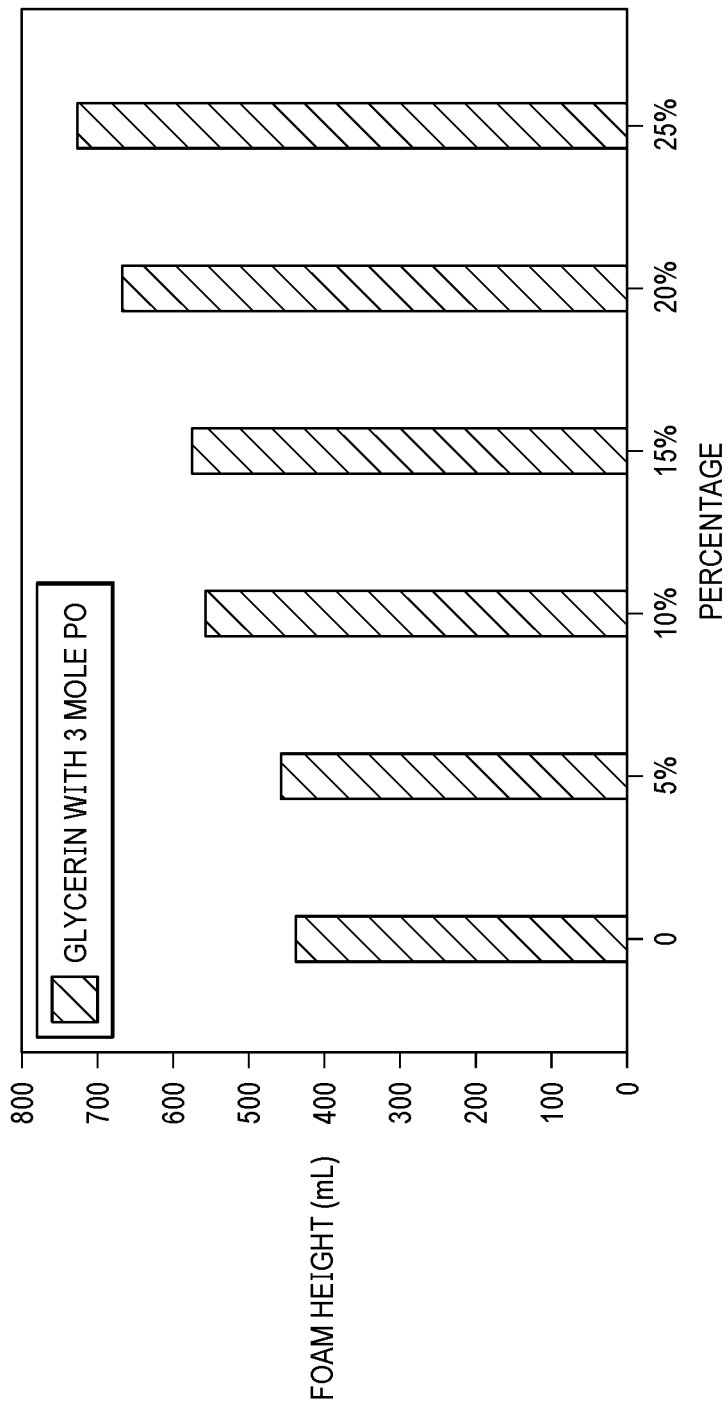
FIG. 5 is a graph illustrating an experiment measuring foam height in accordance with one or more examples described herein.
Figure 6:
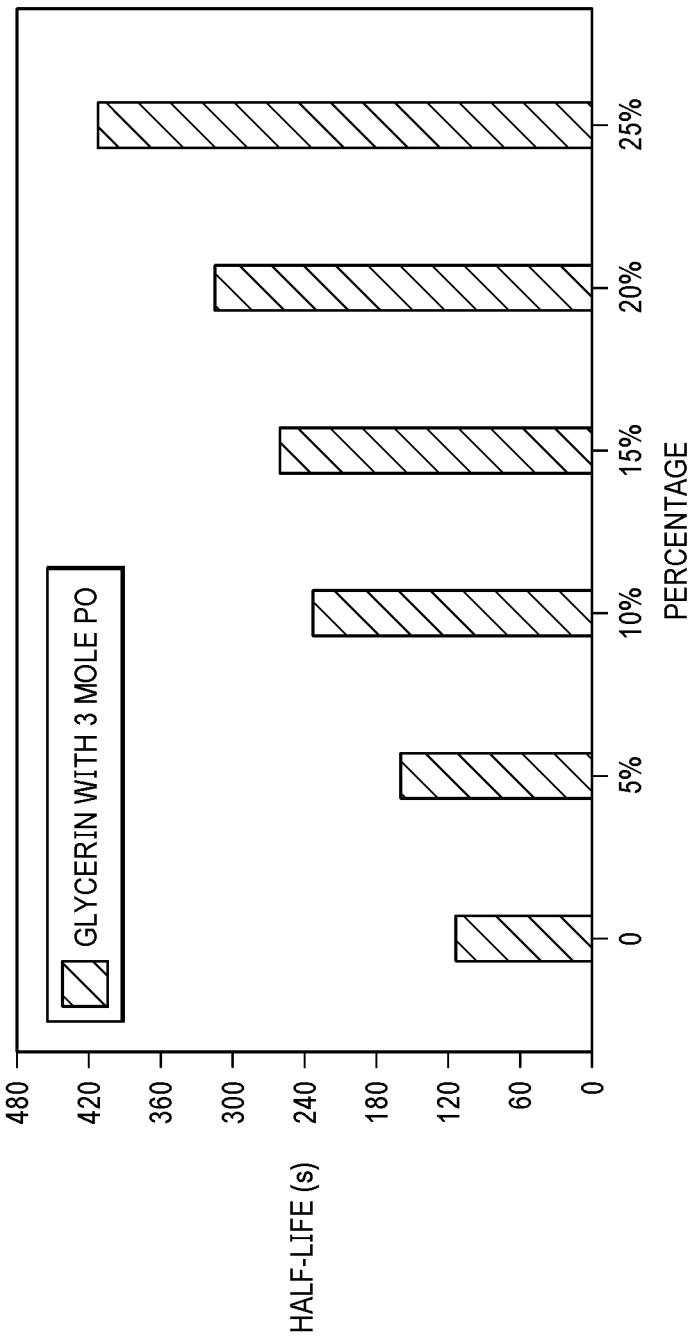
FIG. 6 is a graph illustrating an experiment measuring foam half-life in accordance with one or more examples described herein.

Example 1 is an experiment illustrating the foam enhancement effect of a propoxylate formed from the reaction of glycerin with three moles of propylene oxide. The foam enhancer was used with a foaming agent of 60% cocamidopropyl hydroxysultaine in an aqueous base fluid solution. The foam height is illustrated by FIG. 5 and the foam half-life is illustrated by FIG. 6. The concentration of the propoxylate was increased in five percent intervals from 0% to 25%.

Figure 7:
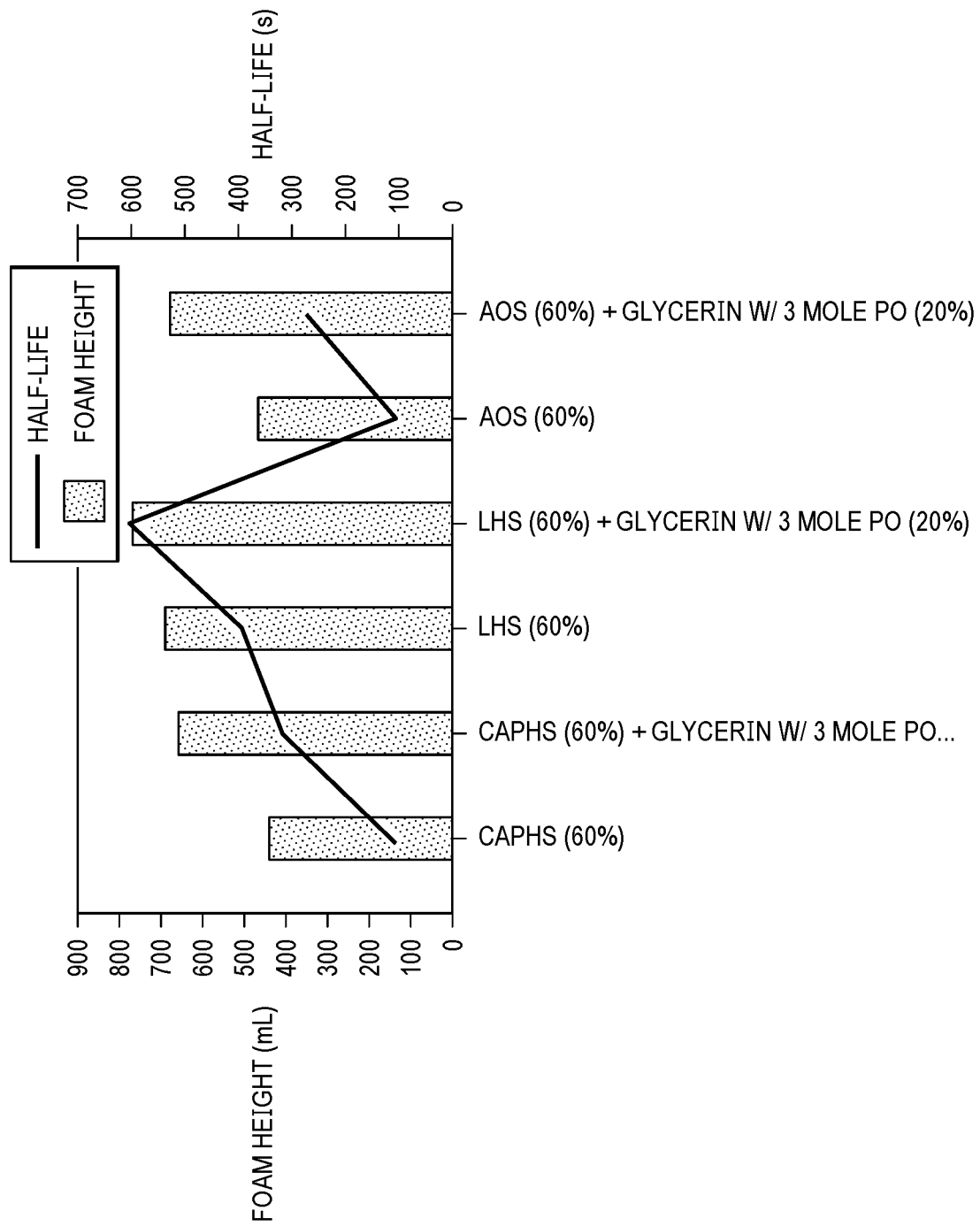
FIG. 7 is graph illustrating a comparison of the foam enhancement effect of a propoxylate with different foaming agents in accordance with one or more examples described herein.

Example 2 is an experiment illustrating the foam enhancement effect of a propoxylate formed from the reaction of glycerin with three moles of propylene oxide. The foam enhancer was present at a concentration of 20%. In this example, the foam enhancer was used with three different foaming agents: 60% cocamidopropyl hydroxysultaine, 60% lauramidopropyl hydroxysultaine, or 60% alpha olefin sulfonate. Both the foam height and the foam half-life were measured. The results are illustrated by FIG. 7.

Example 3 is a comparison of various propoxylates on a foaming agent of 60% cocamidopropyl hydroxysultaine in an aqueous base fluid solution. Both the foam height and the foam half-life were measured. The results are illustrated by FIG. 8.

The foamed treatment fluids disclosed herein may directly or indirectly affect one or more components or pieces of equipment associated with or which may come into contact with the foamed treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Provided are foamed treatment fluid for treating a wellbore in accordance with the disclosure and the illustrated FIGs. An example foamed treatment fluid comprises an aqueous base fluid, a foaming agent, and a propoxylates.

Additionally or alternatively, the foamed treatment fluids may include one or more of the following features individually or in combination. The propoxylate may be selected from the group consisting of propoxylated methanol, propoxylated ethanol, propoxylated propanol, propoxylated butanol, propoxylated pentanol, propoxylated ethylene glycol, propoxylated propanediol, propoxylated pentaerythritol, propoxylated glycerol, propoxylated sorbitol, propoxylated formic acid, propoxylated acetic acid, propoxylated citric acid, propoxylated oxalic acid, propoxylated succinic acid, propoxylated maleic acid, propoxylated adipic acid, propoxylated methylamine, propoxylated dimethylamine, propoxylated trimethylamine, propoxylated ethylamine, propoxylated ethylenediamine, propoxylated diethylene triamine, propoxylated triethylene tetramine, propoxylated tetraethylenepentamine, and any combination thereof. The propoxylate may have a molecular weight in a range of about 90 to about 1000 g/mol. The propoxylate may be present in the treatment fluid at a concentration in a range of about 1% w/w to about 50% w/w. The propoxylate may be the reaction product of propylene oxide and an alcohol, acid, amine, or vegetable oil. The foaming agent may be selected from the group consisting of hydroxysultaines; betaines; anionic surfactants; amine oxides; cocoamidopropyl dimethylamine oxide; methyl ester sulfonates; alkyl or alkene amidobetaines; alkyl or alkene amidipropylbetaines; alpha-olefin sulfonates; quaternary surfactants; C8 to C22 alkylethoxylate sulfates; mixtures of an ammonium salt of an alkyl ether sulfate and sodium chloride; and any combination thereof. The foaming agent may be present in the treatment fluid at a concentration in a range of about 100 ppm to about 50,000 ppm. The treatment fluid may be a treatment fluid selected from the group consisting of a drilling fluid, a well cleanup fluid, a workover fluid, a conformance fluid, a cementing fluid, a gravel pack fluid, an acidizing fluid, a fracturing fluid, a spacer fluid, a gas lifting chemical, and any combination thereof.

Provided are methods for treating a wellbore with a foamed treatment fluid in accordance with the disclosure and the illustrated FIGs. An example method comprises preparing a foamed treatment fluid by combining an aqueous base fluid, a foaming agent, and a propoxylates. The method further includes introducing the foamed treatment fluid into a wellbore and performing a wellbore operation with the foamed treatment fluid.

Additionally or alternatively, the method may include one or more of the following features individually or in combination. The treatment fluid may be a drilling fluid and the wellbore operation comprises drilling the wellbore in a subterranean formation. The treatment fluid may be a cementing fluid and the wellbore operation comprises forming a cement sheath in a portion of the wellbore. The treatment fluid may be a spacer fluid and the wellbore operation comprises introducing the treatment fluid in the wellbore after a drilling fluid has been pumped into the wellbore to displace the drilling fluid. The propoxylate may be selected from the group consisting of propoxylated methanol, propoxylated ethanol, propoxylated propanol, propoxylated butanol, propoxylated pentanol, propoxylated ethylene glycol, propoxylated propanediol, propoxylated pentaerythritol, propoxylated glycerol, propoxylated sorbitol, propoxylated formic acid, propoxylated acetic acid, propoxylated citric acid, propoxylated oxalic acid, propoxylated succinic acid, propoxylated maleic acid, propoxylated adipic acid, propoxylated methylamine, propoxylated dimethylamine, propoxylated trimethylamine, propoxylated ethylamine, propoxylated ethylenediamine, propoxylated diethylene triamine, propoxylated triethylene tetramine, propoxylated tetraethylenepentamine, and any combination thereof. The propoxylate may have a molecular weight in a range of about 90 to about 1000 g/mol. The propoxylate may be present in the treatment fluid at a concentration in a range of about 1% w/w to about 50% w/w. The propoxylate may be the reaction product of propylene oxide and an alcohol, acid, amine, or vegetable oil. The foaming agent may be selected from the group consisting of hydroxysultaines; betaines; anionic surfactants; amine oxides; cocoamidopropyl dimethylamine oxide; methyl ester sulfonates; alkyl or alkene amidobetaines; alkyl or alkene amidipropylbetaines;

alpha-olefin sulfonates; quaternary surfactants; C8 to C22 alkylethoxylate sulfates; mixtures of an ammonium salt of an alkyl ether sulfate and sodium chloride; and any combination thereof. The foaming agent may be present in the treatment fluid at a concentration in a range of about 100 ppm to about 50,000 ppm. The treatment fluid may be a treatment fluid selected from the group consisting of a drilling fluid, a well cleanup fluid, a workover fluid, a conformance fluid, a cementing fluid, a gravel pack fluid, an acidizing fluid, a fracturing fluid, a spacer fluid, a gas lifting chemical, and any combination thereof.

Provided are systems for treating a wellbore with a foamed treatment fluid in accordance with the disclosure and the illustrated FIGs. An example system comprises a foamed treatment fluid comprising an aqueous base fluid, a foaming agent, and a propoxylates. The system further comprises mixing equipment configured to mix the aqueous base fluid, the foaming agent, and the propoxylate; and pumping equipment configured to pump the foamed treatment fluid in a wellbore.

Additionally or alternatively, the system may include one or more of the following features individually or in combination. The system may further comprise a drill string and a drill bit; wherein the foamed treatment fluid is pumped through the drill string and the drill bit. The system may further comprise a cement sheath formed from the foamed treatment fluid. The propoxylate may be selected from the group consisting of propoxylated methanol, propoxylated ethanol, propoxylated propanol, propoxylated butanol, propoxylated pentanol, propoxylated ethylene glycol, propoxylated propanediol, propoxylated pentaerythritol, propoxylated glycerol, propoxylated sorbitol, propoxylated formic acid, propoxylated acetic acid, propoxylated citric acid, propoxylated oxalic acid, propoxylated succinic acid, propoxylated maleic acid, propoxylated adipic acid, propoxylated methylamine, propoxylated dimethylamine, propoxylated trimethylamine, propoxylated ethylamine, propoxylated ethylenediamine, propoxylated diethylene triamine, propoxylated triethylene tetramine, propoxylated tetraethylenepentamine, and any combination thereof. The propoxylate may have a molecular weight in a range of about 90 to about 1000 g/mol. The propoxylate may be present in the treatment fluid at a concentration in a range of about 1% w/w to about 50% w/w. The propoxylate may be the reaction product of propylene oxide and an alcohol, acid, amine, or vegetable oil. The foaming agent may be selected from the group consisting of hydroxysultaines; betaines; anionic surfactants; amine oxides; cocoamidopropyl dimethylamine oxide; methyl ester sulfonates; alkyl or alkene amidobetaines; alkyl or alkene amidipropylbetaines; alpha-olefin sulfonates; quaternary surfactants; C8 to C22 alkylethoxylate sulfates; mixtures of an ammonium salt of an alkyl ether sulfate and sodium chloride; and any combination thereof. The foaming agent may be present in the treatment fluid at a concentration in a range of about 100 ppm to about 50,000 ppm. The treatment fluid may be a treatment fluid selected from the group consisting of a drilling fluid, a well cleanup fluid, a workover fluid, a conformance fluid, a cementing fluid, a gravel pack fluid, an acidizing fluid, a fracturing fluid, a spacer fluid, a gas lifting chemical, and any combination thereof.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for treating a well using a foamed treatment fluid, the method comprises:

preparing a foamed treatment fluid by combining an aqueous base fluid, a foaming agent, and a propoxylate having a molecular weight in a range of about 90 to about 1000 g/mol; wherein the propoxylate is selected from the group consisting of propoxylated methanol, propoxylated ethanol, propoxylated propanol, propoxylated butanol, propoxylated pentanol, propoxylated ethylene glycol, propoxylated propanediol, propoxylated pentaerythritol, propoxylated glycerol, propoxylated sorbitol, propoxylated formic acid, propoxylated acetic acid, propoxylated citric acid, propoxylated oxalic acid, propoxylated succinic acid, propoxylated maleic acid, propoxylated adipic acid, propoxylated methylamine, propoxylated dimethylamine, propoxylated trimethylamine, propoxylated ethylamine, propoxylated ethylenediamine, propoxylated diethylene triamine, propoxylated triethylene tetramine, propoxylated tetraethylenepentamine, and any combination thereof;

introducing the foamed treatment fluid into a wellbore; and performing a gas lifting operation to remove liquids from the wellbore with the foamed treatment fluid.

2. The method of claim 1, wherein the propoxylate is present in the treatment fluid at a concentration in a range of about 1% w/w to about 50% w/w.

3. The method of claim 1, wherein the propoxylate is the reaction product of propylene oxide and an alcohol, acid, amine, or vegetable oil.

4. The method of claim 1, wherein the foaming agent is selected from the group consisting of hydroxysultaines; betaines; anionic surfactants; amine oxides; cocoamidopropyl dimethylamine oxide; methyl ester sulfonates; alkyl or alkene amidobetaines; alkyl or alkene amidipropylbetaines; alpha-olefin sulfonates; quaternary surfactants; C8 to C22 alkylethoxylate sulfates; mixtures of an ammonium salt of an alkyl ether sulfate and sodium chloride; and any combination thereof.

5. The method of claim 1, wherein the foaming agent is present in the treatment fluid at a concentration in a range of about 100 ppm to about 50,000 ppm.

6. The method of claim 1, wherein the foamed treatment fluid has a density in a range of from about 4 pounds per gallon ("lb/gal") to about 20 lb/gal.

7. The method of claim 1, wherein the treatment fluid is foamed with a foam quality in a range of about 70% to about 99%.

8. The method of claim 1, wherein the propoxylate is an alcohol propoxylate.

9. The method of claim 1, wherein the propoxylate is an acid propoxylate.

10. The method of claim 1, wherein the propoxylate is an amine propoxylate.

11. A system for treating a well using a foamed treatment fluid, the system comprises:

a foamed treatment fluid comprising:
 an aqueous base fluid,
 a foaming agent, and
 a propoxylate having a molecular weight in a range of about 90 to about 1000 g/mol; wherein the propoxylate is selected from the group consisting of propoxylated methanol, propoxylated ethanol, propoxylated propanol, propoxylated butanol, propoxylated pentanol, propoxylated ethylene glycol, propoxylated propanediol, propoxylated pentaerythritol, propoxylated glycerol, propoxylated sorbitol, propoxylated formic acid, propoxylated acetic acid, propoxylated citric acid, propoxylated oxalic acid, propoxylated succinic acid, propoxylated maleic acid, propoxylated adipic acid, propoxylated methylamine, propoxylated dimethylamine, propoxylated trimethylamine, propoxylated ethylamine, propoxylated ethylenediamine, propoxylated diethylene triamine, propoxylated triethylene tetramine, propoxylated tetraethylenepentamine, and any combination thereof;

mixing equipment configured to mix the aqueous base fluid, the foaming agent, and the propoxylate; and pumping equipment configured to pump the foamed treatment fluid in a wellbore; wherein the foamed treatment fluid and the pumping equipment are configured to perform a gas lifting operation to remove liquids from a wellbore.

12. The system of claim 11, wherein the propoxylate is present in the treatment fluid at a concentration in a range of about 1% w/w to about 50% w/w.

13. The system of claim 11, wherein the propoxylate is the reaction product of propylene oxide and an alcohol, acid, amine, or vegetable oil.

14. The system of claim 11, wherein the foaming agent is selected from the group consisting of hydroxysultaines; betaines; anionic surfactants; amine oxides; cocoamidopropyl dimethylamine oxide; methyl ester sulfonates; alkyl or alkene amidobetaines; alkyl or alkene amidipropylbetaines; alpha-olefin sulfonates; quaternary surfactants; C8 to C22 alkylethoxylate sulfates; mixtures of an ammonium salt of an alkyl ether sulfate and sodium chloride; and any combination thereof.

15. The system of claim 11, wherein the foaming agent is present in the treatment fluid at a concentration in a range of about 100 ppm to about 50,000 ppm.

16. The system of claim 11, wherein the foamed treatment fluid has a density in a range of from about 4 pounds per gallon ("lb/gal") to about 20 lb/gal.

17. The system of claim 11, wherein the treatment fluid is foamed with a foam quality in a range of about 70% to about 99%.

18. The system of claim 11, wherein the propoxylate is an alcohol propoxylate.

19. The system of claim 11, wherein the propoxylate is an acid propoxylate.

20. The system of claim 11, wherein the propoxylate is an amine propoxylate.

* * * * *